US008884947B2

(12) United States Patent
Tomite et al.

(10) Patent No.: US 8,884,947 B2
(45) Date of Patent: Nov. 11, 2014

(54) IMAGE PROCESSING APPARATUS AND IMAGE PROCESSING METHOD

(75) Inventors: Kaname Tomite, Tokyo (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 12/237,930

(22) Filed: Sep. 25, 2008

(65) Prior Publication Data

US 2009/0102834 A1    Apr. 23, 2009

(30) Foreign Application Priority Data

Oct. 19, 2007   (JP) ................................ 2007-273088
Jul. 16, 2008   (JP) ................................ 2008-185295

(51) Int. Cl.
G06T 15/00    (2011.01)
G06T 19/00    (2011.01)
H04N 13/02    (2006.01)

(52) U.S. Cl.
CPC ............ *G06T 19/00* (2013.01); *H04N 13/0282* (2013.01); *G06T 2210/52* (2013.01); *H04N 13/0275* (2013.01)
USPC ...................................................... 345/419

(58) Field of Classification Search
CPC ....... G06T 15/40; G06T 15/503; G06T 15/20; H04N 13/0003; H04N 13/004; H04N 13/0402; H04N 13/044
USPC ...................................................... 345/419
See application file for complete search history.

(56) References Cited

U.S. PATENT DOCUMENTS

| | | | | |
|---|---|---|---|---|
| 5,583,975 A | * | 12/1996 | Naka et al. | 345/426 |
| 6,088,006 A | * | 7/2000 | Tabata | 345/7 |
| 2002/0121209 A1 | | 9/2002 | Danilo et al. | |
| 2003/0008713 A1 | * | 1/2003 | Ushiro et al. | 463/42 |
| 2007/0057944 A1 | | 3/2007 | Redert | |
| 2007/0257902 A1 | * | 11/2007 | Satoh et al. | 345/419 |
| 2008/0094468 A1 | * | 4/2008 | Tseng et al. | 348/43 |
| 2008/0192147 A1 | * | 8/2008 | Choi | 348/716 |

FOREIGN PATENT DOCUMENTS

| | | |
|---|---|---|
| JP | 05-028280 A | 2/1993 |
| JP | 2532055 | 6/1996 |
| JP | 10-232953 A | 9/1998 |
| JP | 2006-163547 A | 6/2006 |
| JP | 2007-264966 A | 10/2007 |

OTHER PUBLICATIONS

Japanese Translation—JP 2006-040308; Mori, Shoji; Game Server Device, Game Server Method, and Program.*

(Continued)

*Primary Examiner* — Xiao Wu
*Assistant Examiner* — Wynton S Jones
(74) *Attorney, Agent, or Firm* — Cowan, Liebowitz & Latman, P.C.

(57) ABSTRACT

A CPU (201) updates scene data (206) by changing the management order of the data of virtual objects in the scene data (206) based on the processing result of a search of the scene data (206), which is executed upon generating an image of virtual space viewed from a first viewpoint. The CPU (201) sets the updated scene data (206) as scene data (206) to be used to generate an image viewed from a second viewpoint different from the first viewpoint.

10 Claims, 13 Drawing Sheets

(56) References Cited

OTHER PUBLICATIONS

Japanese Translation—JP 2003-365331; Sato, Akishi; 3-Dimensional View Image Processing Device, Information Providing Method, Image Display Method.*

"VR World Construction Technique", Baifukan, 2000, supervised by Susumu Tachi and edited by Michitaka Hirose.

"Interactive Rendering with Coherent Ray tracing" in computer graphics Forum/Proceedings of the Eurographics 2001, pp. 153-164, 20 (3), Manchester, United Kingdom, Sep. 3-7, 2001, Ingo Wald, Carsten Benthin, Markus Wagner and Philipp Slusallek.

The above references were cited in a Apr. 16, 2012 Japanese Office Action, which is enclosed without an English Translation, that issued in Japanese Patent Application No. 2008-185295.

The above references were cited in a Aug. 14, 2013 European Search Report a which is enclosed of the counterpart European Patent Application No. 080015608.6.

* cited by examiner

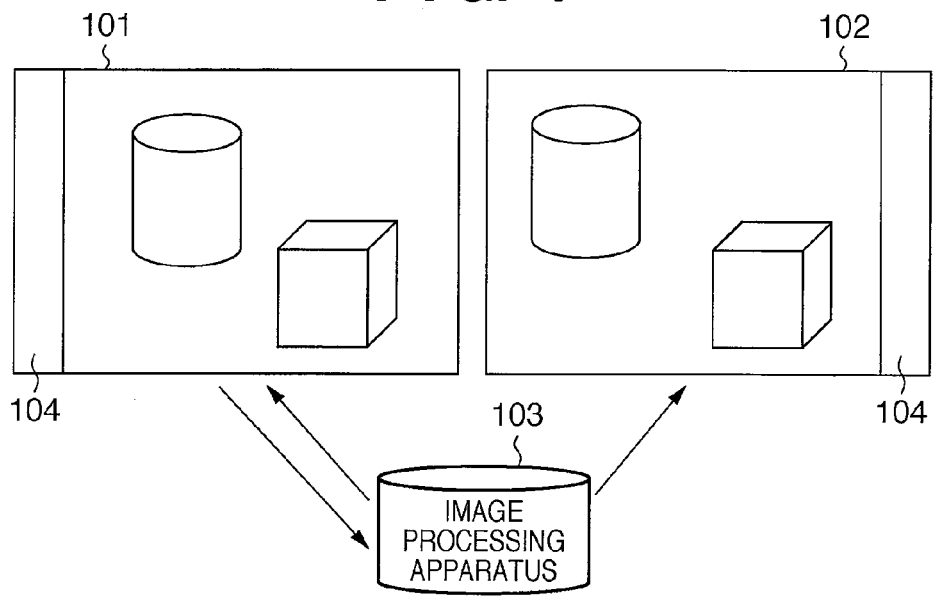
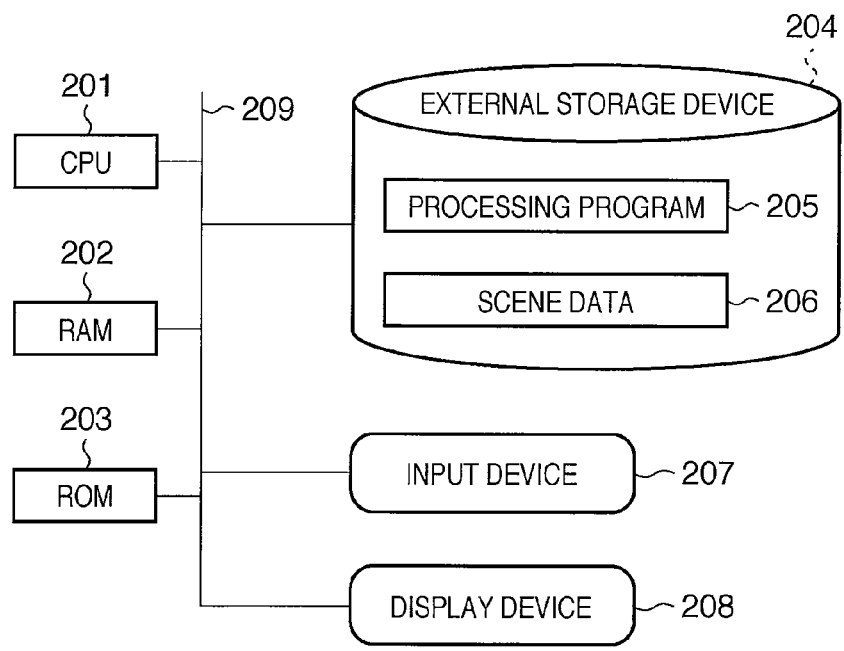

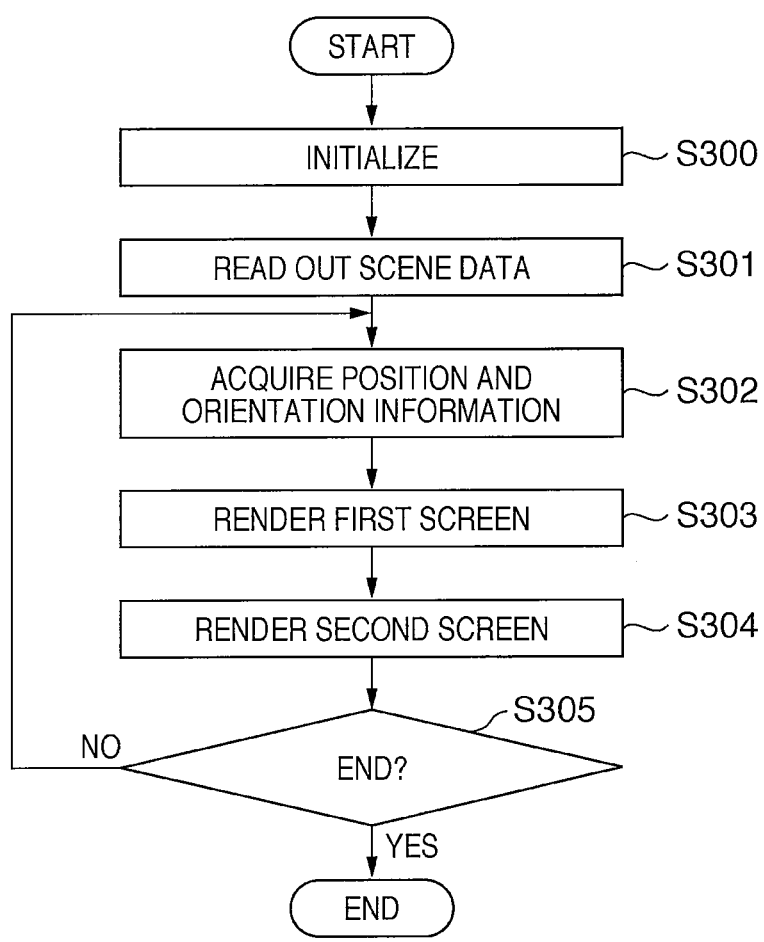

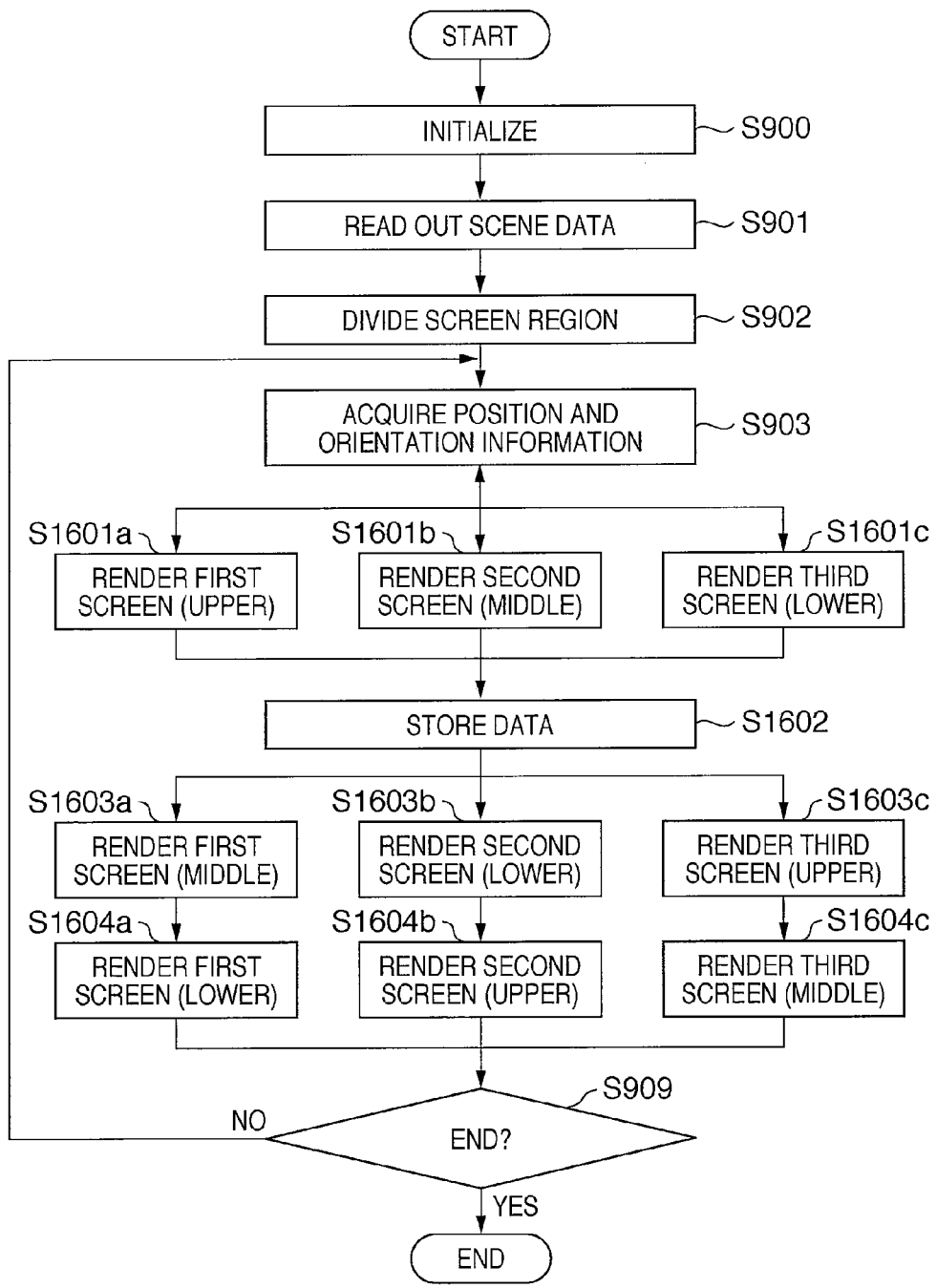

IMAGE PROCESSING APPARATUS AND IMAGE PROCESSING METHOD

BACKGROUND OF THE INVENTION

1. Field of the Invention

The present invention relates to a virtual space image generation technique.

2. Description of the Related Art

As the processing capability of computers has improved recently, studies of a Virtual Reality technique of providing real experiences to users have progressed (see non-patent reference 1). The technique is implemented by expressing virtual space by computer graphics and displaying it on an HMD (Head Mounted Display) or a wall-type display.

In this field, an element necessary for providing a high-quality experience to a user is the speed of image generation. The processing speed required for generating a virtual space image while following a user's viewpoint movement is generally supposed to be 10 to 15 frames/sec. To meet this requirement, a technique of generating an image at a high speed while maintaining expressive power higher than before has been developed.

The recent sophisticated computer parallelization and virtual space handling techniques have enabled a real-time ray tracing method which was impossible previously (see non-patent reference 2). The ray tracing method disclosed in non-patent reference 2 is particularly called real-time ray tracing and has extensively been studied. This technique allows expressions of reflection and refraction, high-speed shadow generation, and expressions of global illumination, which were difficult for a conventional rasterization method. It is therefore possible to generate a high-quality image.

As the expressive power of image generation processing rises, a calculation load necessary for obtaining a high-quality image is increasing steadily. The amount of data to be processed is also increasing to meet the desires for displaying objects in virtual space in real time. For these reasons, even when real-time ray tracing is implemented, a calculation load reducing technique is indispensable to output at a high frame rate while maintaining high expressive power.

Patent reference 1 discloses a method of increasing the efficiency of animation generation by ray tracing using a time-series correlation. An animation expresses a motion by updating the screen (frame) that changes gradually. The gradually changing screen contains a time-series correlation (coherence) such as the positional relationship of objects that should be within sight.

In image generation processing using ray tracing, generally, the time required for a search in ray tracing is the longest. In patent reference 1, using the coherence between time-series images, the result of a preceding frame is reused for a portion where no change occurs between the preceding frame and the current frame, thereby shortening the search time in the ray tracing method.

[Non-patent reference 1] "VR World Construction Technique", supervised by Susumu Tachi, and edited by Michitaka Hirose, Baifukan, 2000

[Non-patent reference 2] Ingo Wald, Carsten Benthin, Markus Wagner, and Philipp Slusallek, "Interactive Rendering with Coherent Ray-Tracing" in Computer Graphics Forum/Proceedings of the EUROGRAPHICS 2001, pp. 153-164, 20 (3), Manchester, United Kingdom, Sep. 3-7, 2001

[Patent reference 1] Japanese Patent No. 2532055

The above method increases the time-series efficiency and speed of image generation processing by ray tracing. However, processing of generating a plurality of images of different viewpoints at once is not taken into consideration at all. For example, to make a user wearing an HMD experience virtual space, it is necessary to generate two images for right and left eyes simultaneously and present them to him/her as a stereoscopic image. In stereoscopic image generation, the right-eye image and left-eye image are generated based on different viewpoint positions and orientations, and therefore, the ray reflection directions are different. For this reason, the time-series correlation cannot be used. To generate a stereoscopic image to be presented to the user, image generation processing must be executed for each of the right and left eyes.

SUMMARY OF THE INVENTION

The present invention has been made in consideration of the above-described problem, and has as its object to provide a technique of efficiently generating a plurality of virtual space images.

According to the first aspect of the present invention, an image processing apparatus for rendering a common object from a plurality of viewpoints, comprises:

a first unit which renders a first image; and a second unit which renders a second image, wherein each of the first unit and the second unit renders an unrendered region by referring to information obtained by a process of rendering of the other unit.

According to the second aspect of the present invention, an image processing method executed by an image processing apparatus for rendering a common object from a plurality of viewpoints, comprises:

a first step of rendering a first image; and a second step of rendering a second image, wherein in each of the first step and the second step, an unrendered region is rendered by referring to information obtained by a process of rendering in the other step.

Further features of the present invention will become apparent from the following description of exemplary embodiments with reference to the attached drawings.

BRIEF DESCRIPTION OF THE DRAWINGS

FIG. 1 is a view for explaining the outline of image processing according to the first embodiment of the present invention;

FIG. 2 is a block diagram showing the hardware configuration of a computer applicable to an image processing apparatus according to the first embodiment of the present invention;

FIG. 3 is a flowchart illustrating processing executed by a computer having the configuration shown in FIG. 2 to generate virtual space images to be presented to the right and left eyes of a user;

FIG. 16 is a flowchart illustrating processing executed by a computer having the configuration shown in FIG. 2 to generate virtual space images to be presented to the right and left eyes of a user according to the fifth embodiment of the present invention.

DESCRIPTION OF THE EMBODIMENTS

Figure 4:
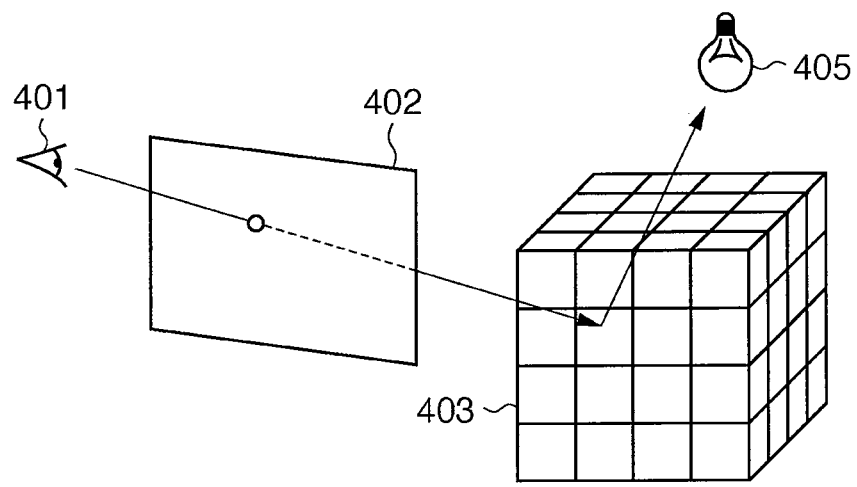
FIG. 4 is a view for explaining a ray tracing method and division of virtual space.

Preferred embodiments of the present invention will now be described in detail with reference to the accompanying drawings. The embodiments will be explained as examples of preferred arrangements of the present invention described in the claims, but the present invention is not limited to the embodiments to be described below.

First Embodiment

This embodiment assumes that virtual space images to be presented to the right and left eyes of a user (observer) are generated by a ray tracing method. More specifically, in this embodiment, a virtual space image to be presented to one eye is generated, and the calculation result obtained by the generation processing is stored. Then, the calculation result is used to generate a virtual space image to be presented to the other eye. This increases the efficiency and speed of processing of generating virtual space images to be presented to the eyes.

FIG. 1 is a view for explaining the outline of image processing according to this embodiment. This embodiment assumes that when a user is to experience virtual space, virtual space images of different viewpoint positions and orientations are generated for the right and left eyes by a ray tracing method. Hence, virtual space images based on different viewpoint positions and orientations are respectively displayed on a screen 101 for displaying an image to be presented to the user's left eye and a screen 102 for displaying an image to be presented to the user's right eye.

The viewpoint positions and orientations of the images displayed on the screens 101 and 102 are assumed to be not so largely different, like the interocular distance of a human. For this reason, in this embodiment, virtual objects displayed on the screen 101 are assumed to be seen on the screen 102, too. Such assumption makes it possible to use the calculation result obtained by generating the virtual space image for the left eye even in the processing of generating the virtual space image for the right eye.

An image processing apparatus 103 generates virtual space images to be displayed on the screens 101 and 102 by a ray tracing method.

Regions 104 of the screens 101 and 102 do not overlap in the visual fields of the right and left eyes. For the regions 104, the calculation result obtained upon generating a virtual space image to be displayed on a screen cannot be reused. Hence, calculation is necessary in every image generation processing.

In image processing calculation using the ray tracing method, processing of searching for a virtual object that intersects a ray takes the longest processing time.

The difficulty of a search depends on the abundance of virtual objects, i.e., the complexity of the scene. Assume that 10,000 virtual objects exist in a scene. If the 10000th object in a scene tree which manages the elements included in the virtual space using a tree structure is the rendering target, the search processing needs to be performed 10,000 times every time a virtual space image of a frame is generated (the virtual object search processing will be described later in detail).

In this embodiment, when a virtual object to be seen to one eye was searched from scene data in order to generate a virtual space image to be presented to the eye, the search result is used in processing of generating a virtual space image to be presented to the other eye. This reduces the total calculation load and speeds up image generation processing.

FIG. 2 is a block diagram showing the hardware configuration of a computer applicable to the image processing apparatus according to this embodiment. The hardware of a computer is not limited to the illustrated configuration. A computer having any other configuration is also usable if it mainly includes an execution unit which executes processing and a storage unit which stores programs and data.

In FIG. 2, using computer programs and data stored in a RAM 202 and a ROM 203, a CPU 201 controls the overall computer and executes each processing to be described later as the processing of the computer.

The RAM 202 has an area for temporarily storing a processing program 205 (computer program) and scene data 206 loaded from an external storage device 204 and also has a work area to be used by the CPU 201 to execute various kinds of processing. That is, the RAM 202 can provide various kinds of areas, as needed.

The ROM 203 stores a boot program and setting data of the computer.

The external storage device 204 is a mass information storage device represented by a hard disk drive. The external storage device 204 stores the processing program 205 and the scene data 206 as well as an OS (Operating System). The external storage device 204 also stores known information to be described later and information to be used by those skilled in the art in a practical manner in the following description. The computer programs and data stored in the external storage device 204 are loaded to the RAM 202, as needed, under the control of the CPU 201. The CPU 201 executes various kinds of processing using the loaded computer programs and data.

The processing program 205 stored in the external storage device 204 is a computer program which causes the CPU 201 to execute various kinds of processing to be described later as the processing of the computer.

The scene data 206 is data to manage elements included in virtual space by a tree format (tree structure). For example, when a virtual object includes known polygons, the scene data 206 contains the color data and normal vector data of the polygons and the coordinate value data of each vertex of the polygons (these data will be referred to as geometric information hereinafter). If the virtual object has texture mapping, the scene data 206 also contains texture mapping data. The scene data 206 also contains information of the type and luminance of a virtual light source which irradiates the virtual space.

When a virtual space image is rendered using a ray tracing method, the scene data 206 also contains space division information for facilitating intersection determination of a ray and a virtual object. In this embodiment, a virtual space image is generated by a ray tracing method, as described above.

An input device 207 inputs the position and orientation information of each of the right and left eyes of the user who observes a virtual space image. Hence, various devices are applicable as the input device 207.

For example, a keyboard or a mouse may be used as the input device 207. In this case, the user manually inputs the position and orientation information of each eye using the input device 207.

A position and orientation sensor may be used as the input device 207. In this case, the position and orientation sensor is attached to the user's head. The position and orientation sensor inputs the measurement result to the RAM 202 as data. The CPU 201 obtains the positions and orientations of the right and left eyes using the measurement result data, the position and orientation relationship between the position and orientation sensor and the right eye, and that between the position and orientation sensor and the left eye.

As described above, various methods are available to acquire the position and orientation information of the user's right and left eyes, and the present invention is not limited to one method. The device to be applied as the input device 207 is determined in accordance with the method.

A display device 208 displays the virtual space image for the right eye and that for the left eye generated by the CPU 201 and is formed from, e.g., a CRT or a liquid crystal panel. The display device 208 can also display any other information, as a matter of course. More specifically, the display device 208 can display the processing result of the CPU 201 using an image or a text.

A bus 209 connects the above-described units.

Processing executed by a computer having the configuration shown in FIG. 2 to generate virtual space images (right eye virtual space image and left eye virtual space image) to be presented to the right and left eyes of the user will be described next with reference to FIG. 3 that is a flowchart illustrating the processing.

Note that the computer programs (including the processing program 205) and data (including the scene data 206) to make the CPU 201 execute the processing according to the flowchart shown in FIG. 3 are stored in the external storage device 204. As described above, the computer programs and data are loaded to the RAM 202, as needed, under the control of the CPU 201. The CPU 201 executes processing using the loaded computer programs and data. Hence, the computer executes the processing according to the flowchart shown in FIG. 3.

In step S300, initialization processing is executed for subsequent processing. The initialization processing includes processing of reading out the processing program 205 from the external storage device 204 and loading it to the RAM 202. The initialization processing also includes processing of allocating an area to be used for subsequent processing in the RAM 202.

In step S301, the scene data 206 is read out from the external storage device 204 and sequentially expanded on the RAM 202. The data expanded on the RAM 202 at this time contains a scene tree and node information, which describe the tree structure of the overall scene. The node information contains the geometric information and material information of virtual objects which are individual elements of the scene tree, and virtual light source information.

In step S302, the position and orientation information of each of viewpoints (right and left eyes) in virtual space is acquired in the RAM 202. The acquisition can be done by various methods, as described above. In this embodiment, the user manually inputs the information using the input device 207. However, predetermined fixed values may be used as the viewpoint position and orientation information of the right eye and that of the left eye.

In step S303, a virtual space image (first screen) to be presented to one eye (first viewpoint) is generated using the data group acquired in the RAM 202 in step S301 and the position and orientation information of the right and left eyes acquired in the RAM 202 in step S302. The generated first screen is displayed on the display screen of the display device 208. The processing in this step will be described later in detail.

In step S304, a virtual space image (second screen) to be presented to the other eye (second viewpoint) is generated using the scene data 206 updated in the processing in step S303. The generated second screen is displayed on the display screen of the display device 208. The processing in this step will also be described later in detail.

In step S305, it is determined whether to finish the processing. To finish the processing, for example, the user inputs an end instruction using the input device 207. Alternatively, a processing end condition may be set in advance. If it is determined to finish the processing, the processing is ended. If the processing is not to be ended, the process returns to step S302 to perform the processing of generating the right eye virtual space image and left eye virtual space image of the next frame.

The ray tracing method will be described next with reference to FIG. 4. FIG. 4 is a view for explaining the ray tracing method and division of virtual space.

In the ray tracing method, processing of projecting a ray from a viewpoint 401 set in virtual space to each pixel of a virtual screen 402 is executed. The intersection between each ray that has passed through the virtual screen 402 and a virtual object in, e.g., octree-divided virtual space 403 is determined. When a ray intersects the virtual object, the information of the virtual object is searched for from the scene data 206. Reflection of light from a virtual light source 405 with respect to the virtual object, which is represented by the found information, is calculated, thereby determining the pixel value on the virtual screen 402. This processing is done for all pixels of the virtual screen 402.

The virtual space 403 is octree-divided to facilitate the determination of intersection between a ray and the virtual object. For the ray tracing method, many techniques of facilitating intersection determination by dividing space have been proposed. Examples are kd-tree division and BVH (Boundary Volume Hierarchy). This embodiment does not depend on the space division algorithm. Hence, any space division method is usable.

The information of the virtual object that intersects a ray is obtained by searching for a scene tree in the scene data 206.

Figure 5:
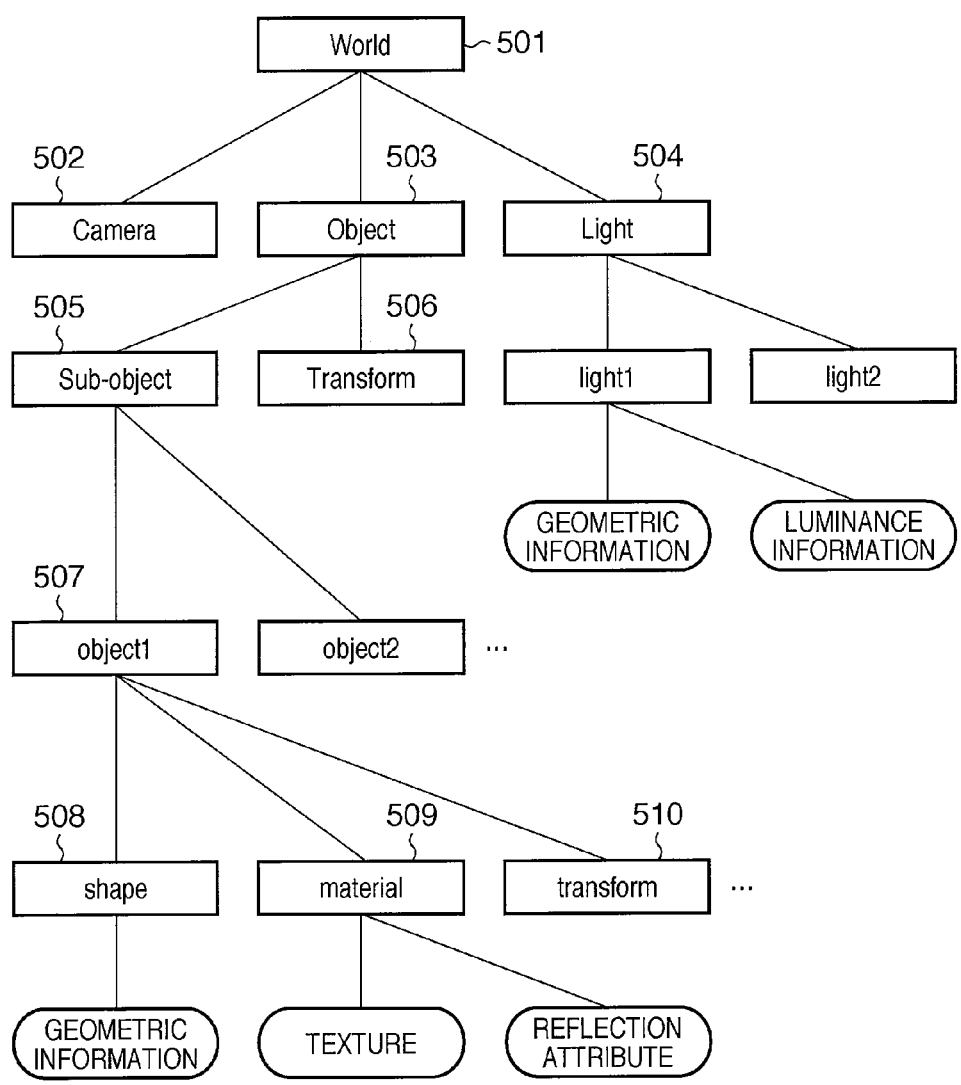
FIG. 5 is a view showing an example of the structure of a tree represented by scene data 206.

The scene data 206 will be described next. FIG. 5 is a view showing an example of the structure of a tree represented by the scene data 206.

"World" 501 is a node corresponding to the base (root) node of a scene (virtual space). This node defines the absolute coordinates of the scene.

"Camera" 502 is a node which stores the position and orientation, and the angle of view of the viewpoint.

"Object" 503 is a node which holds various kinds of information of the virtual object. Generally, since a scene includes a plurality of virtual objects, "Sub-object" 505 which groups the virtual objects in the scene is prepared under the "Object" 503.

"Transform" 506 is a parameter that defines the position and orientation of the "Object" 503 with respect to the absolute coordinates of the "World" 501.

The "Sub-object" 505 is a node which groups "object 1" 507, "object 2", . . . which are minimum units representing a virtual object. Object nodes as many as the virtual objects that appear in the scene are associated under the "Sub-object" 505.

The "object 1" 507 has the information of "shape" 508, "material" 509, and "transform" 510.

The "shape" 508 has geometric shape information such as the coordinate value data of each vertex of polygons of the "object 1" 507 and the normal vector data.

The "material" 509 stores, as attribute data, the texture information of the "object 1" 507 and diffused reflection information and mirror reflection information of light from the light source.

The "transform" 510 represents the position and orientation information of the "object 1" 507.

"Light" 504 has the information of a virtual light source that irradiates the virtual space scene and stores the data of the position (geometric information), type (e.g., direct light, point source, or spot light), and luminance information (including tint information) of the virtual light source.

In the above-described arrangement, to obtain the information of a virtual object that intersects a ray, processing of searching for a scene tree (a search in the scene data) shown in FIG. 5 needs to be performed as many as the number of intersections of rays. That is, the amount of search processing becomes enormous when a ray intersects a virtual object at a deep position of the hierarchical structure or in a scene including many virtual objects.

Figure 6:
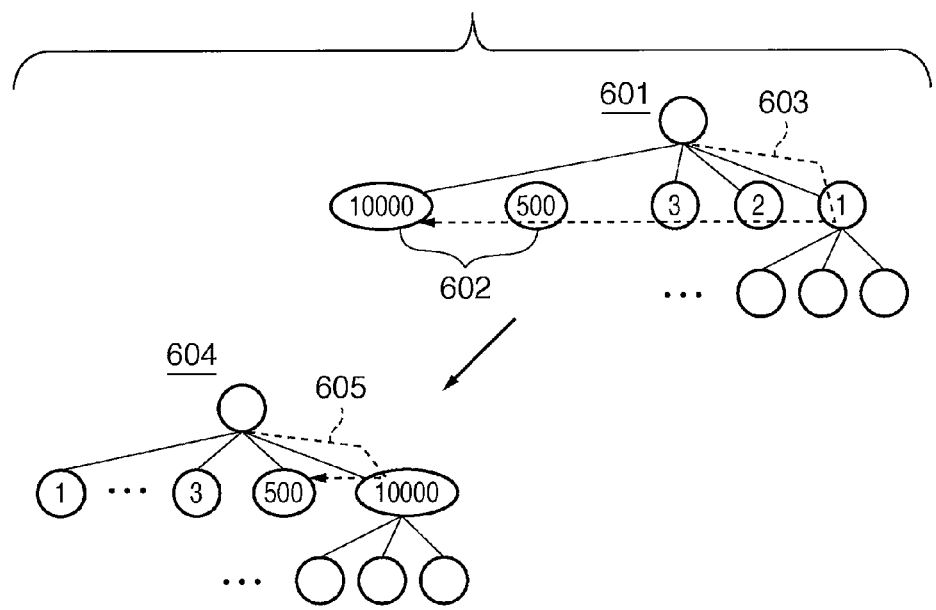
FIG. 6 is a view showing a scene tree search.

A scene tree search in the scene data 206 will be described next. FIG. 6 is a view showing a scene tree search.

A scene tree 601 is a scene tree in the initial state. Each of child nodes 602 in the scene tree 601 represents a virtual object seen from a given viewpoint (viewpoint of interest). A search route 603 represents a route to search for a node of a virtual object (child node 602) when a ray intersects it. The route is preset.

In the processing of generating a virtual space image seen from a viewpoint of interest, conventionally, the child nodes 602 are searched along the search route 603 as many as the pixels of virtual objects corresponding to the child nodes 602 on the display panel. In the scene tree 601, since the child nodes 602 are located at the end of the search route 603, every search is time-consuming. In this embodiment, to shorten the time, the positions of the child nodes 602 are moved to the top portion of the search route 603, thereby updating the scene tree 601.

More specifically, when the child nodes 602 are found, creation of a new scene tree is started in the RAM 202. First, a copy of the scene tree 601 is created in the RAM 202. The position of each child node 602 in the copied scene tree is moved to the top portion of the search route 603, thereby updating the copied scene tree. That is, the scene data is updated by changing the management order of the data of the virtual object in it. In FIG. 6, reference numeral 604 denotes a copied scene tree that is updated by moving the positions of the child nodes 602 to the top position of the search route 603. As indicated by 605, the route of searching for the child nodes 602 is shorter than the search route 603. The arrangement order (management order) of the nodes in the child nodes 602 is not particularly limited.

When the processing of generating a virtual space image seen from the viewpoint of interest is ended, the scene tree 601 is updated to the copied scene tree. The updated scene tree 601 is set as a scene tree to be used to generate a virtual space image seen from the other viewpoint except the viewpoint of interest.

As described above, the scene tree updated in the process of generating a virtual space image for a given viewpoint is used to generate a virtual space image for the next viewpoint. Hence, when generating virtual space images for a plurality of viewpoints, the search distance becomes shorter for a viewpoint located later in the generation order.

A node that has not been searched for in the process of generating a virtual space image is arranged at the endmost position of the new scene tree (search route 603). Even a non-searched node is copied to the new scene tree. For this reason, no problem is posed even when the first and second screens have different virtual objects in the visual field. That is, a virtual object that exists only in the second screen is not the target of rearrangement in the new scene tree. However, since the new scene tree stores the information of the virtual object, the virtual object can be displayed without any problem.

As described above, when generating a virtual space image for one viewpoint, the position of the node of a virtual object to be searched in the scene tree is rearranged at the top position of the search route, thereby implementing efficient search processing.

In the node rearrangement operation for new scene tree creation, the frequency of search may be counted, and the scene tree may be rearranged not based on the search order but in the order of search frequency. More specifically, the number of times of search is counted for each node. When the generation processing of one virtual space image is ended, the nodes are arranged from the top of the search route in descending order of count value.

Additionally, if no virtual object is in the visual field in the process of image generation of the first screen, the scene tree search processing is unnecessary in the second screen. Hence, when information representing that no virtual object is in the visual field is added to the information of the new scene tree in the process of image processing of the first screen, it is possible to execute the second screen image generation processing at a high speed.

For the second screen image generation processing when no virtual object is in the visual field of the first screen, a background image is prepared as a texture in advance, and image generation processing is performed not by ray tracing but by texture rendering.

In some cases, a virtual object is included only in the second screen. In this case, the presence/absence information of the virtual object cannot be used. However, the phenomenon that only one eye can see a virtual object occurs when the disparity is high because of the extremely short distance between the virtual object and the viewpoint position. To use the presence/absence information of a virtual object, a restriction is imposed to make a virtual object exist at a predetermined depth value or more from the viewpoint so as to prevent the disparity from becoming high. This restriction makes it possible to use the presence/absence information of a virtual object.

If the viewpoint position and orientation in first screen image generation are the same or almost the same as those in second screen image generation, the search result of the first screen equals that of the second screen. This allows to reuse the search result of the first screen for the second screen image generation processing.

The problem of scene search is always necessary in various kinds of image generation processing (e.g., rasterization method, volume rendering method, and particle rendering method). Hence, the method of increasing the efficiency of image generation by scene reconstruction is effective even when the image generation processing is changed. Hence, this embodiment is applicable to various kinds of image generation processing in general.

In this embodiment, the display device 208 of the computer displays the first and second screens. However, any other display device may display the first and second screens. For example, when an HMD is connected to the computer, the right eye display screen of the HMD may display the right eye virtual space image while the left eye display screen may display the left eye virtual space image.

Second Embodiment

In the first embodiment, the first and second screens are generated by sequential processing. In the second embodiment, however, the first and second screens are divided and generated in parallel.

Figure 7:
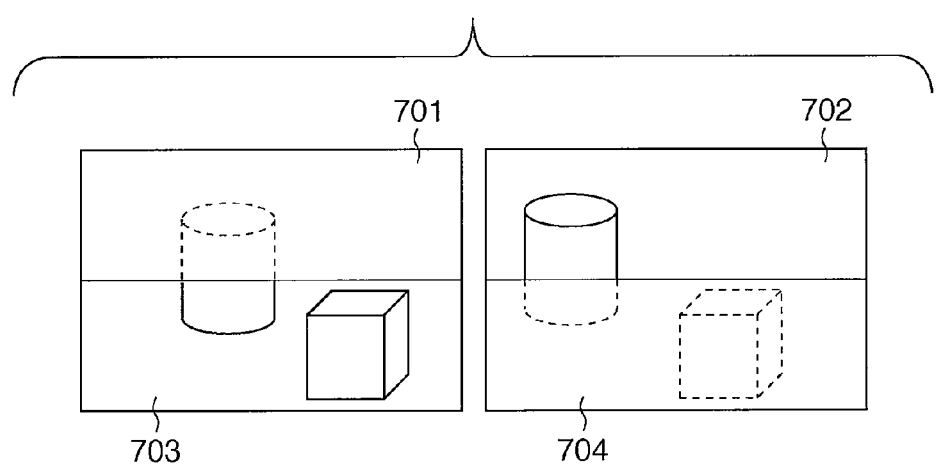
FIG. 7 is a view for explaining the outline of image processing according to the second embodiment of the present invention.

FIG. 7 is a view for explaining the outline of image processing according to this embodiment.

This embodiment assumes that each of the first and second screens is divided into upper and lower regions, and each region is processed by one CPU.

Referring to FIG. 7, reference numeral 701 denotes an upper region (partial region) of the first screen; and 703, a lower region of the first screen. The upper region 701 and lower region 703 are obtained by dividing the first screen into upper and lower parts. The upper and lower regions do not overlap.

Referring to FIG. 7, reference numeral 702 denotes an upper region of the second screen; and 704, a lower region of the second screen. The upper region 702 and lower region 704 are obtained by dividing the second screen into upper and lower parts. The upper and lower regions do not overlap.

In this embodiment, the upper region of one screen and the lower region of the other screen are generated in parallel. In the generation processing of the upper region of one screen, original scene data is copied, and the copied scene tree is updated, as in the first embodiment, to move the nodes of a virtual object that appears in the upper region of one screen to the top of the search route. In the generation processing of the lower region of the other screen, original scene data is copied, and the copied scene tree is updated, as in the first embodiment, to move the nodes of a virtual object that appears in the lower region of the other screen to the top of the search route. That is, in this embodiment, the scene data for one screen (first scene data) and the scene data for the other screen (second scene data) are generated.

Next, the lower region of one screen and the upper region of the other screen are generated in parallel. In the generation processing of the lower region of one screen, the scene data updated in the process of generating the lower region of the other screen is used. In the generation processing of the upper region of the other screen, the scene data updated in the process of generating the upper region of one screen is used.

As described above, two processes are executed in parallel. Hence, scene tree search processing can be started efficiently when image generation has finished up to the half of a screen.

Figure 8:
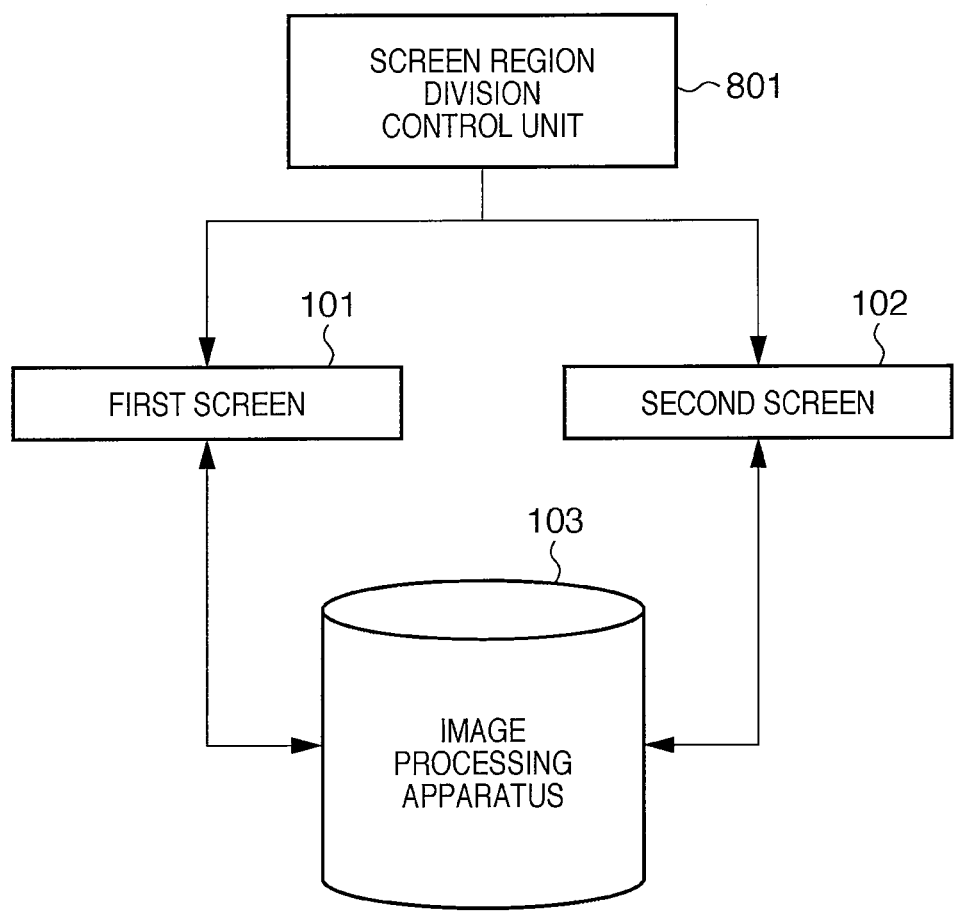
FIG. 8 is a view for explaining the outline of image processing according to the second embodiment of the present invention.

FIG. 8 is a view for explaining the outline of image processing according to this embodiment. The same reference numerals as in FIG. 1 denote the same parts in FIG. 8, and a description thereof will not be repeated. In this embodiment, to generate a first screen 101 and a second screen 102 in parallel, a screen region division control unit 801 is added. This allows to divide each screen into regions and execute image generation processing in first and second halves in generating the images of the first screen 101 and second screen 102 in parallel.

Additionally, in this embodiment, information exchange is performed in the second half of image generation. Hence, information acquired in the process of image generation of the second screen 102 is also output to an image processing apparatus 103 and used for image generation of the first screen 101, unlike the first embodiment.

Processing according to this embodiment, which is executed by a computer having the configuration shown in FIG. 2 to generate virtual space images to be presented to the right and left eyes of the user, will be described next with reference to FIG. 9 that is a flowchart illustrating the processing.

Figure 9:
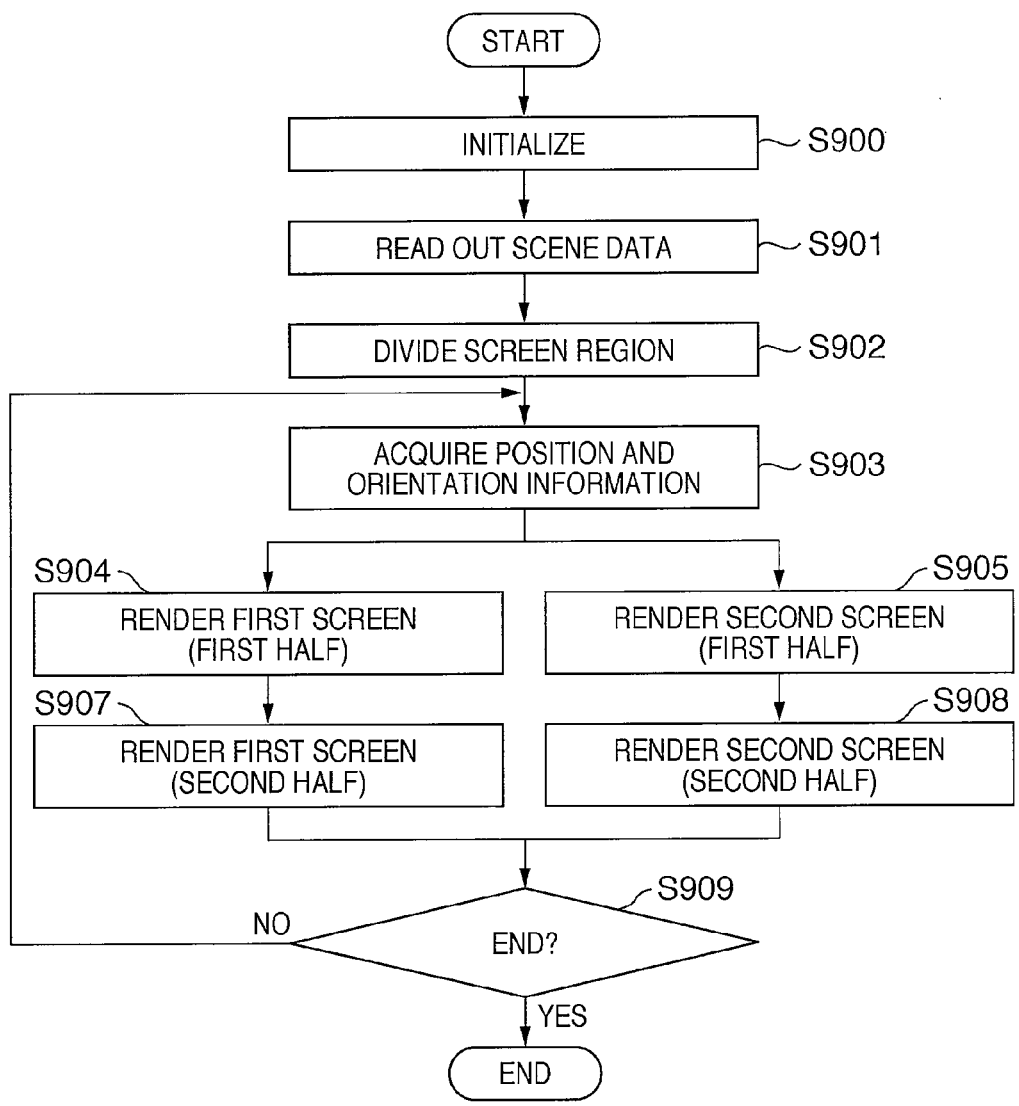
FIG. 9 is a flowchart illustrating processing executed by a computer having the configuration shown in FIG. 2 to generate virtual space images to be presented to the right and left eyes of a user according to the second embodiment of the present invention.

Note that the computer programs (including a processing program 205) and data (including scene data 206) to make a CPU 201 execute the processing according to the flowchart shown in FIG. 9 are stored in an external storage device 204. As described above, the computer programs and data are loaded to a RAM 202, as needed, under the control of the CPU 201. The CPU 201 executes processing using the loaded computer programs and data. Hence, the computer executes the processing according to the flowchart shown in FIG. 9.

In step S900, initialization processing is executed for subsequent processing. The initialization processing includes processing of reading out the processing program 205 from the external storage device 204 and loading it to the RAM 202. The initialization processing also includes processing of allocating an area to be used for subsequent processing in the RAM 202.

In step S901, the scene data 206 is read out from the external storage device 204 and sequentially expanded on the RAM 202. The data expanded on the RAM 202 at this time contains a scene tree and node information, which describe the tree structure of the overall scene. The node information contains the geometric information and material information of virtual objects which are individual elements of the scene tree, and virtual light source information.

In step S902, each of the screen for the right eye and the screen for the left eye is divided into two, upper and lower regions. Region information representing each divided region is generated and stored in the RAM 202. The region information contains, e.g., information representing to which screen (right eye screen or left eye screen) the region belongs, and the coordinate positions of the upper left and lower right corners of the region.

In step S903, the position and orientation information of each of viewpoints (right and left eyes) in virtual space is acquired in the RAM 202. The acquisition of the pieces of position and orientation information can be done by various methods, as described above. In this embodiment, the user manually inputs the information using the input device 207. However, predetermined fixed values may be used as the position and orientation information of the right eye and that of the left eye.

In step S904, the upper region of a virtual space image (first screen) to be presented to one eye is generated using the data group acquired in the RAM 202 in steps S901 and S902 and the position and orientation information of the right and left eyes acquired in the RAM 202 in step S903. The generated upper region of the first screen is displayed on the display screen of the display device 208.

Processing in step S905 is executed in parallel to step S904. In step S905, the lower region of a virtual space image (second screen) to be presented to the other eye is generated using the data group acquired in the RAM 202 in steps S901 and S902 and the position and orientation information of the right and left eyes acquired in the RAM 202 in step S903. The generated lower region of the second screen is displayed on the display screen of the display device 208.

In step S907, the lower region of the first screen is generated using the scene data updated in step S905. The generated lower region of the first screen is displayed on the display screen of the display device 208.

In step S908 parallel to step S907, the upper region of the second screen is generated using the scene data updated in step S904. The generated upper region of the second screen is displayed on the display screen of the display device 208.

In step S909, it is determined whether to finish the processing. To finish the processing, for example, the user inputs an end instruction using the input device 207. Alternatively, a processing end condition may be set in advance. If it is determined to finish the processing, the processing is ended. If the processing is not to be ended, the process returns to step S903 to perform the processing of generating the right eye virtual space image and left eye virtual space image of the next frame. And then, subsequent processing is performed for the next frame.

This embodiment assumes that the image generation of the first screen and image generation of the second screen are performed simultaneously in two processes by setting the parallel count to 2. However, the parallel count need not always be 2. The embodiment can also cope with a parallel count of 3 or more. In this case, a screen region is divided in accordance with the parallel count, and a scene tree for increasing the search efficiency is generated in each process.

This embodiment assumes that image generation processing is executed by dividing a screen into two, upper and lower regions. However, a screen need not always be divided into two, upper and lower regions. A screen may be divided into two, left and right regions. When the parallel count increases, the screen region division method may be changed accordingly. A preferably screen division method can be selected in accordance with a system to be built or a scene to be experienced. At any rate, in this embodiment, image generation is performed a plurality of number of times to parallelly generate a virtual space image for one viewpoint and that for the other viewpoint.

<Modification>

An example of adaptive screen division will be described here.

Figure 10A:
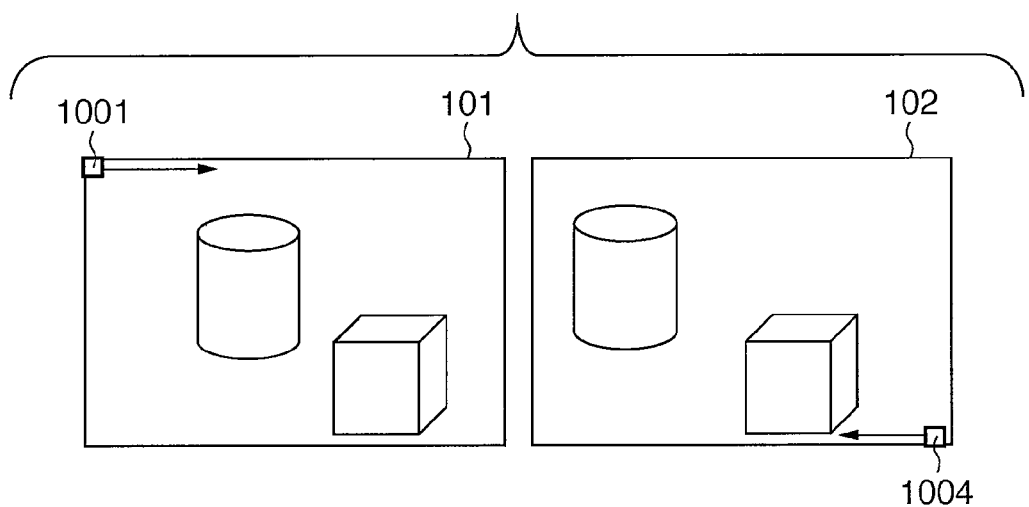
FIGS. 10A and 10B are views for explaining processing of adaptively dividing a screen.
Figure 10B:
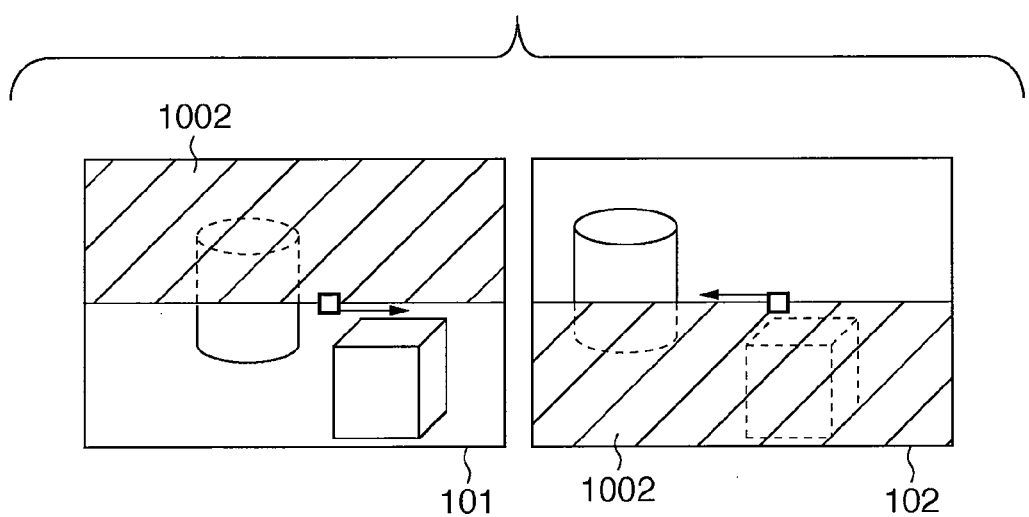

FIGS. 10A and 10B are views for explaining processing of adaptively dividing a screen.

Referring to FIG. 10A, image generation processing in the first screen 101 starts from a position 1001 of the upper left corner. Image generation processing in the second screen 102 starts from a position 1004 of the lower right corner. As shown in FIG. 10B, when the positions of pixels that are currently being processed have reached the same position in the two screens, scene data updated upon generating the second screen is used for the first screen to process the remaining region. For the second screen, scene data updated upon generating the first screen is used. In FIG. 10B, reference numeral 1002 denotes a processed region when the positions of pixels that are currently being processed have reached the same position in the two screens.

As described above, according to this embodiment, a screen is divided in accordance with the parallel processing capability of image generation processing to divisionally execute image generation processing. This allows to efficiently execute image generation processing at a high speed.

Third Embodiment

In the first and second embodiments, image generation is done sequentially for each pixel. The third embodiment is largely different from these embodiments in that only partial regions undergo image generation in the first half of image generation processing, scene data is updated, and then, image generation processing is executed again more specifically.

Figure 11:
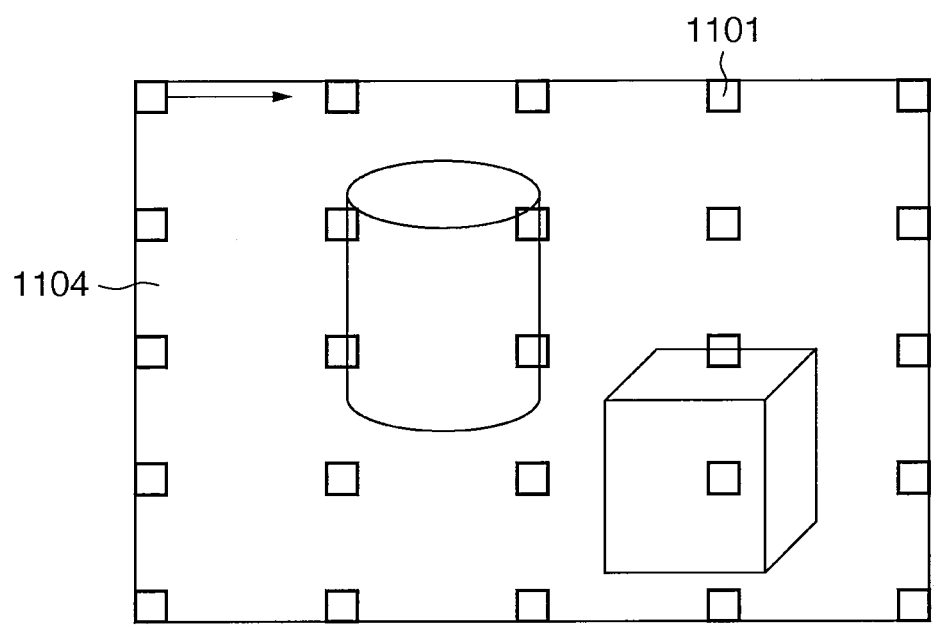
FIG. 11 is a view for explaining image generation processing according to the third embodiment of the present invention.

FIG. 11 is a view for explaining image generation processing according to this embodiment. A virtual space image (screen) 1104 included in the visual field from a viewpoint corresponds to the first or second screen. Specific regions 1101 are set in the image 1104. In FIG. 11, the specific regions 1101 are set discretely at an equal interval. In this embodiment, each specific region 1101 corresponds to one pixel of the image 1104. However, the size of the specific region 1101 is not particularly limited. In addition, the specific regions need not always have the illustrated layout.

In this embodiment, one virtual space image is generated in two steps. In generation of the first step (first generation), images in the specific regions are generated. In generation of the second step (second generation), images in the remaining regions (regions except for the specific regions 1101) are generated using scene data updated in the first generation in the same way as in the first embodiment.

In this embodiment, regions to which rays are projected are set discretely as described above. This makes it possible to reconstruct the scene data of the entire scene at a high speed without calculating all pixels on the screen.

For the regions except for the specific regions 1101, image generation can be performed efficiently by executing detailed image generation processing again after scene reconstruction. The method of this embodiment is very effective mainly for image generation processing such as ray tracing which calculates each pixel in determining a pixel value on the screen.

The scene reconstruction in the specific regions may be applied to both a first screen 101 and a second screen 102. Alternatively, a result obtained by applying the scene reconstruction to one of the screens may be applied to image generation processing in both of the first and second screens.

Fourth Embodiment

In the first, second, and third embodiments, processing of efficiently generating images by exchanging scene data output in each image generation process has been described. The fourth embodiment is different from these embodiments in that in image generation processing by rasterization, viewpoint coordinate transformation is executed for the depth value output in an image generation process for each of the left and right eyes and the processed depth value is used.

The outline of image processing according to this embodiment is the same as that described in the second embodiment in many points, and only different points will be described.

In this embodiment, first, the luminance values of partial regions, which do not overlap, of an upper region 701 and a lower region 704 obtained by region division as shown in FIG. 7 are calculated by a normal rendering method. The depth values (the values of the Z buffer) obtained in the process of calculating the luminance value at this time, and the material information of the target object are stored in a RAM 202.

The depth values stored in the RAM 202 are transformed into depth values in the coordinate system of the other viewpoint. If the depth values obtained by the transformation and the material information of the target object are available, the luminance value can be calculated.

Figure 12:
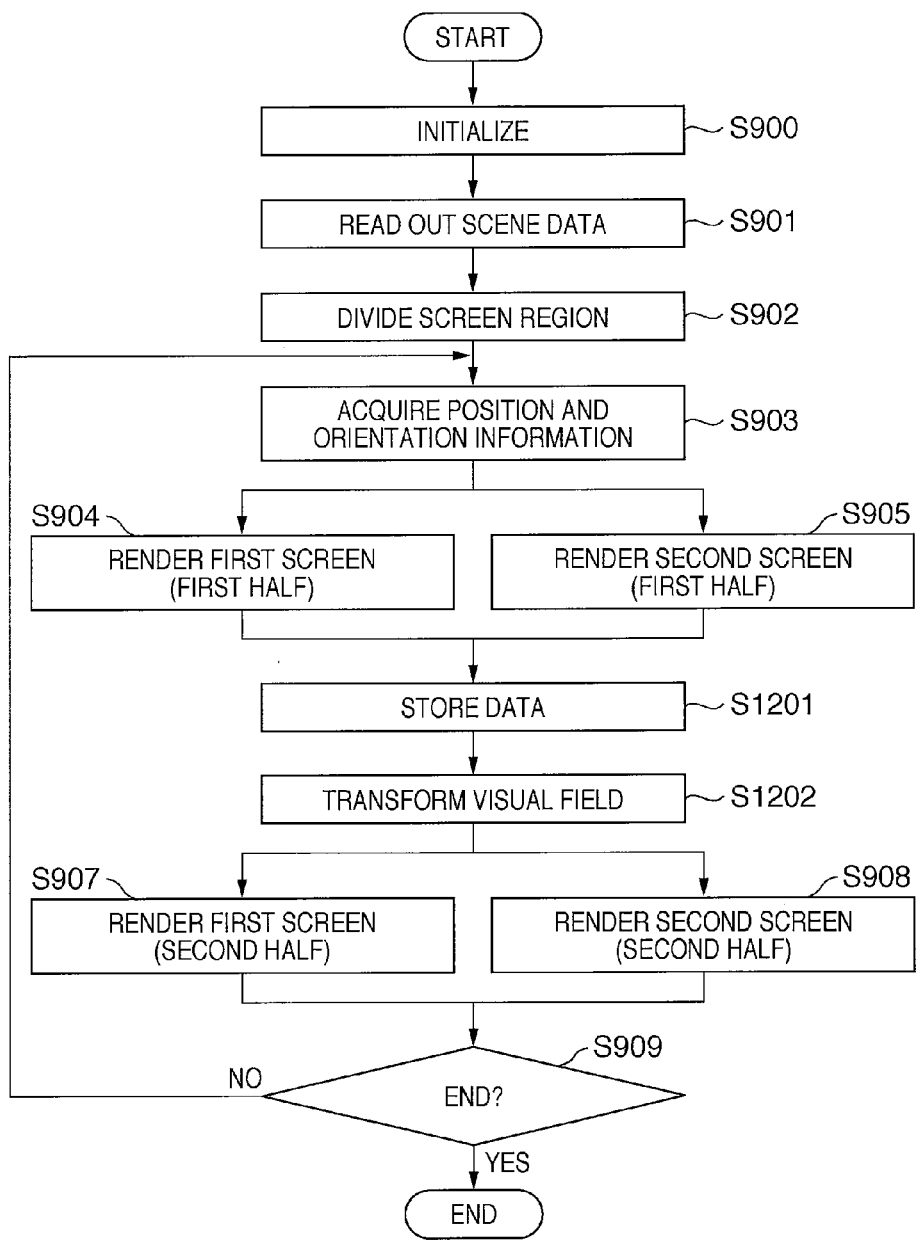
FIG. 12 is a flowchart illustrating processing executed by a computer having the configuration shown in FIG. 2 to generate virtual space images to be presented to the right and left eyes of a user according to the fourth embodiment of the present invention.

Processing according to this embodiment, which is executed by a computer having the configuration shown in FIG. 2 to generate virtual space images to be presented to the right and left eyes of the user, will be described next with reference to FIG. 12 that is a flowchart illustrating the processing. The same step numbers as in FIG. 9 denote the steps of executing the same processes in FIG. 12.

In steps S904 and S905, processing of obtaining the luminance value of each pixel of each divided region is performed, in addition to the processing described in the second embodiment.

In step-S1201, the depth values (the values of the Z buffer) obtained in the processing in steps S904 and S905, the normal information of each vertex of the target object, and the material information of the target object are stored in the RAM 202.

In step S1202, viewpoint coordinate transformation is performed for the depth values stored in the RAM 202 in step S1201. The coordinate transformation is processing of transforming the depth value for the left eye into the depth value for the right eye and transforming the depth value for the right eye into the depth value for the left eye.

Finally in steps S907 and S908, processing of calculating the luminance value of each pixel of each divided region based on the material information stored in step S1201 is performed for the depth values transformed in step S1202, in addition to the processing described in the second embodiment.

A luminance value determination method in the rendering processing of this embodiment will be described next.

Figure 13:
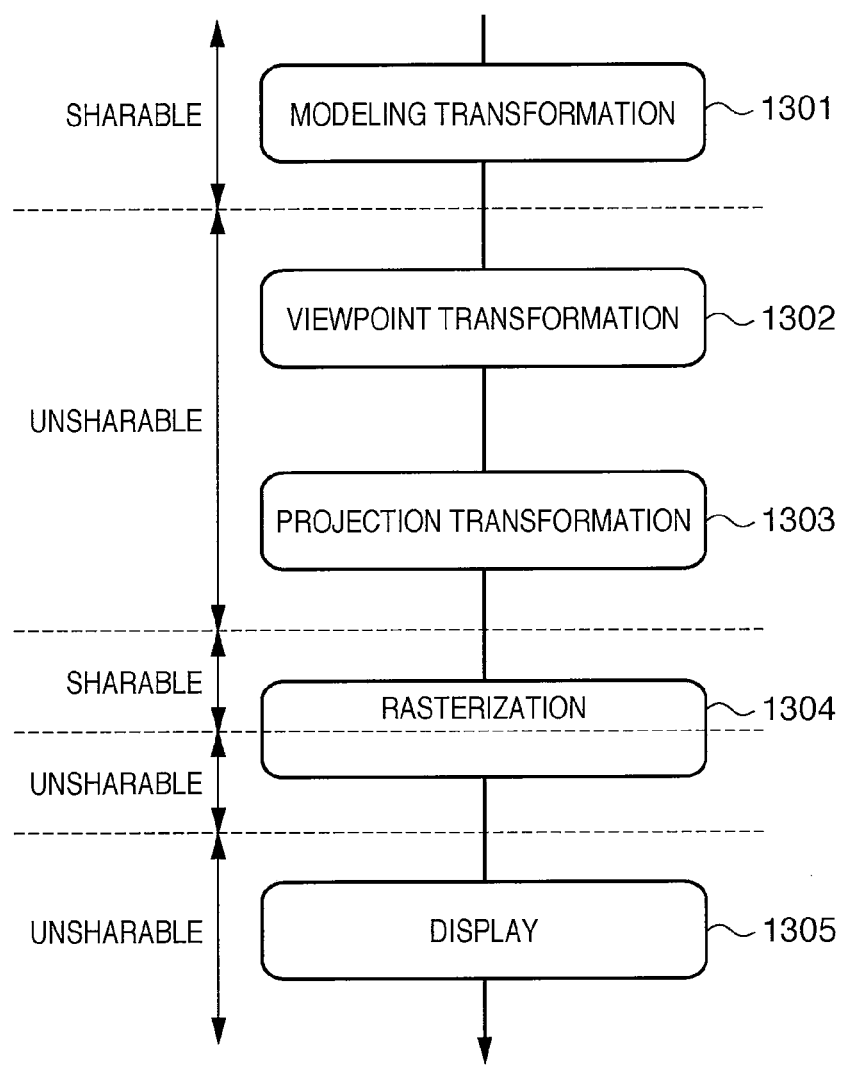
FIG. 13 is a view for explaining the sequence of image generation processing by general rasterization.

FIG. 13 is a view for explaining the sequence of image generation processing by general rasterization.

In modeling transformation 1301, the information (three-dimensional coordinates) of scene data stored in an external storage device 204 is loaded to the RAM 202 and transformed into world coordinates. That is, in modeling transformation 1301, a virtual object is rotated and deformed in three-dimensional space. This transformation also includes basic coordinate transformation such as enlargement/reduction and rotation on local object space. The data obtained upon processing of the modeling transformation 1301 do not depend on the viewpoint position and orientation. Hence, the right and left eyes can share the data.

In viewpoint transformation 1302, the position and orientation of a virtual object defined on the world coordinates are transformed into a position and orientation on the local coordinate system based on the position and orientation of a virtual camera. More specifically, a matrix for viewpoint transformation is obtained in advance, and viewpoint transformation is done using a matrix operation for each vertex of the virtual object. As a result, the original three-dimensional scene is transformed into a scene on the coordinate system viewed from the virtual camera.

Data obtained upon processing of the viewpoint transformation 1302 depend on the respective viewpoints. Hence, the right and left eyes cannot share the data.

In projection transformation 1303, transformation from the three-dimensional coordinate system defined by the virtual camera to a two-dimensional coordinate system is done. By the projection transformation 1303, the virtual space is mapped as two-dimensional information on a plane (virtual screen) viewed from the virtual camera.

In rasterization 1304, after clipping processing and hidden surface removal are executed, the luminance value of each pixel of the two-dimensional image of the scene projected onto the virtual screen is calculated.

In the clipping processing, the polygons of the virtual object outside the visual field are discarded, and only polygons in the visual field are cut out. In the hidden surface removal, polygons which are not directed to the viewpoint, i.e., polygons which are theoretically invisible from the viewpoint are discarded. At this time, polygons which should be visible from the viewpoint are written in the Z buffer in descending order of the distance to the viewpoint. When the values are sequentially overwritten, a depth value corresponding to each pixel value is calculated, and only polygons visible from the viewpoint are selected.

In the rasterization 1304, after the hidden surface removal, the normal information of each vertex and the material information of the virtual object are extracted from the scene data for shading processing. Texture information is also extracted, as needed. If the left and right eyes see the same object, it is possible to share the material information of the object. Reflected light is calculated based on the extracted data and the position and orientation information of the virtual viewpoint. Then, the luminance value of each pixel on the virtual screen is calculated. However, the result of shading processing calculated from the material information of the object changes depending on the position and orientation of the viewpoint and therefore cannot be shared.

In display 1305, the pixels which are colored finally are displayed on a monitor or another display device.

When a common virtual object is observed from different viewpoints in the general rasterization processing, the data obtained by the modeling transformation 1301 and the material information of the object can be shared without transformation processing. However, the depth values obtained in the process of the rasterization 1304 can also be used by viewpoint coordinate transformation. However, occlusion may occur depending on the positional relationship between the viewpoint and the object, and it may be impossible to accurately calculate the depth values. In this case, each luminance value is determined by referring to the corresponding pixel value of the preceding frame.

The method of calculating the luminance value of each pixel from the depth values obtained by viewpoint coordinate transformation will be described next.

Figure 14:
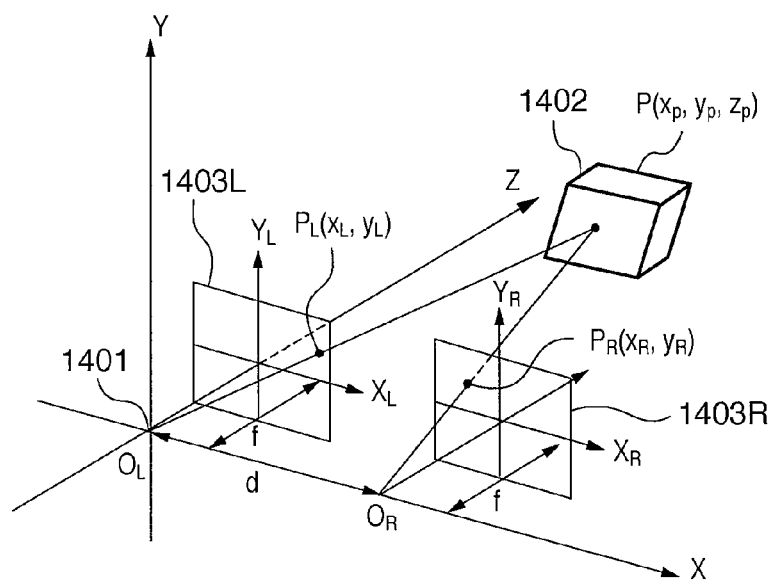
FIG. 14 is a view for explaining a three-dimensional coordinate estimation method by stereoscopic vision.

FIG. 14 is a view for explaining a three-dimensional coordinate estimation method by stereoscopic vision.

As shown in FIG. 14, an xyz absolute coordinate system 1401 is defined in three-dimensional space. The left and right camera lenses are arranged so that the absolute coordinates of their centers are set to $0_L=(0,0,0)$ and $0_R=(d,0,0)$ which are spaced apart by a distance d. Let f be the focal length of the lens, i.e., the distance from the lens center to each of the left and right image planes. A virtual object 1402 is observed from thus set virtual viewpoints. A right eye screen and a left eye screen on which the observed images are projected are defined as virtual screens 1403R and 1403L, respectively.

When the right eye observes a point P on the virtual object 1402, the point P is projected to a point $P_R(x_R, y_R)$ on the virtual screen 1403R. When the left eye observes the point P on the virtual object 1402, the point P is projected to a point $P_L(x_L, y_L)$ on the virtual screen 1403L. The coordinates of the points $P_L$ and $P_R$ are relative coordinates based on origins set as the centers of the virtual screens 1403L and 1403R, respectively.

At this time, a point $P(x_p, y_p, z_p)$ on the surface of the target object can be obtained by triangulation using a triangle formed from a measuring point and the centers of the two cameras.

If the points $P_L$ and $P_R$ and various parameters are known, the three-dimensional coordinates of a target can be calculated. This is the general depth estimation method using stereoscopic vision in computer vision.

In this embodiment, when a pixel value on the screen for one of the left and right eyes and the three-dimensional coordinates of a target corresponding to the pixel are known, the pixel value of a corresponding pixel on the screen for the other eye is determined using the depth estimation method based on stereoscopic vision. For example, when the point $P_R(x_R, y_R)$ and the point $P(x_p, y_p, z_p)$ on the surface of the target object are given as inputs, the point $P_L(x_L, y_L)$ is calculated.

Hence, if the viewpoint position and orientation are known, and the point P on the surface of the target object could be calculated using a depth value obtained by viewpoint coordinate transformation, it is possible to calculate corresponding points on the virtual screens.

In steps S907 and S908, processing of loading the material information of the object, which is stored in the RAM 202, in correspondence with the point on the virtual screen obtained by calculation is performed, in addition to the processing described in the second embodiment. Shading processing and texture mapping processing are executed by the processing of rasterization 1304, thereby calculating individual luminance values. This processing is repeated until all pixels are calculated. The image generation method by rasterization is a known technique which is implemented using hardware for performing general graphics processing.

In the above-described processing, information obtained by the process of calculating the luminance value of a divided region on one screen is shared, thereby calculating the luminance value of the corresponding region on the other screen.

Fifth Embodiment

In the first to fourth embodiments, processing of efficiently generating images by exchanging information obtained in the image generation process when generating a stereoscopic image has been described. The fifth embodiment assumes image generation using a camera system for two or more eyes and is different from the above embodiments in that a screen region is divided into two or more regions, and image generation processing is applied to each region.

Figure 15:
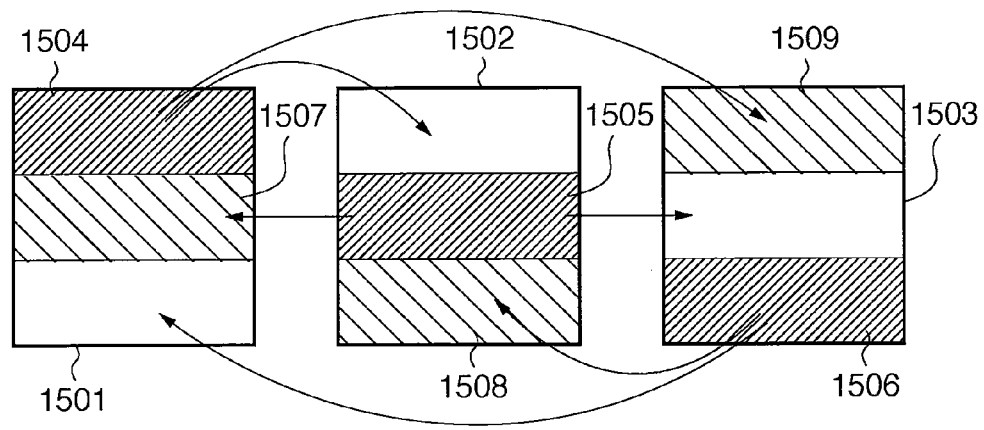
FIG. 15 is a view for explaining the outline of image processing according to the fifth embodiment of the present invention.

FIG. 15 is a view for explaining the outline of image processing according to this embodiment.

Rendering results for three viewpoints are displayed on a first screen 1501, second screen 1502, and third screen 1503, respectively. In this embodiment, each screen is divided into three regions, and rendering is performed in each region.

Regions 1504 to 1506 are rendering regions where processing starts first in the respective screens. In this embodiment, the regions 1504 to 1506 are set not to overlap. When rendering has finished in the regions 1504 to 1506 of the screens, calculation for uncalculated regions 1507 to 1509 starts by referring to the calculation results of the regions 1504 to 1506. When calculation for the uncalculated regions 1507 to 1509 has finished, calculation for the remaining regions is performed.

Processing according to this embodiment, which is executed by a computer having the configuration shown in FIG. 2 to generate virtual space images to be presented to three eyes, will be described next with reference to FIG. 16 that is a flowchart illustrating the processing. The same step numbers as in FIG. 9 denote the steps of executing the same processes in FIG. 16.

In step S902, each of the three screens (first screen, second screen, and third screen) is divided into three, upper, middle, and lower stages (corresponding to the number of cameras). The division form is not particularly limited. Each screen may be divided vertically into equal parts. Alternatively, the divided regions may be changeable depending on the complexity of the scene.

In step S1601a, rendering processing of the upper stage of the first screen is performed. In step S1601b, rendering processing of the middle stage of the second screen is performed. In step S1601c, rendering processing of the lower stage of the third screen is performed. The rendering processing in each of steps S1601a, S1601b, and S1601c is executed in the same way as in the other embodiments.

In step S1602, the rendering results in steps S1601a, S1601b, and S1601c are stored in a RAM 202.

In step S1603a, the luminance value in the region of the middle stage of the first screen is determined by referring to the rendering result of the upper stage of the first screen, which is stored in the RAM 202, and rendering processing of the middle stage is executed. In step S1603b, the luminance value in the region of the lower stage of the second screen is determined by referring to the rendering result of the middle stage of the second screen, which is stored in the RAM 202, and rendering processing of the lower stage is executed. In step S1603c, the luminance value in the region of the upper stage of the third screen is determined by referring to the rendering result of the lower stage of the third screen, which is stored in the RAM 202, and rendering processing of the upper stage is executed. However, the regions where rendering is performed in steps S1603a, S1603b, and S1603c can be arbitrary regions which need only be uncalculated regions at the time of calculation.

In step S1604a, the luminance value in the region of the lower stage of the first screen is determined by referring to the rendering result of the middle stage of the first screen, and rendering processing of the lower stage is executed. In step S1604b, the luminance value in the region of the upper stage of the second screen is determined by referring to the rendering result of the lower stage of the second screen, and rendering processing of the upper stage is executed. In step S1604c, the luminance value in the region of the middle stage of the third screen is determined by referring to the rendering result of the upper stage of the third screen, and rendering processing of the middle stage is executed.

In this embodiment, the calculation results in steps S1603a, S1603b, and S1603c are not stored in the RAM 202. However, depending on the built system, the pieces of information stored in step S1602 may be overwritten by the pieces of information calculated in steps S1603a, S1603b, and S1603c.

Assume that the viewpoints are arranged in the horizontal direction, and the results obtained by arranging the screens corresponding to the viewpoints in accordance with the arrangement order of the viewpoints are the first screen, second screen, and third screen. In this case, the image of the first screen can be generated more efficiently by using the rendering processing result of the second screen with the closer viewpoint than by using the result of the third screen. Hence, to refer to obtained information, a suitable means can be selected depending on the built system.

As described above, even when two or more virtual viewpoints are used to observe a common virtual object, it is possible to efficiently execute rendering at a high speed by dividing each screen into an arbitrary number of regions and sharing the calculation results of the respective regions.

Sixth Embodiment

In region division, the efficiency can be maximized when no regions overlap between the first screen and the second screen. However, if the regions do not overlap at all, the edges of boundary portions become noticeable. The edges can be made unnoticeable by providing an overlap region of several pixels near each boundary edge, and compositing and smoothing images obtained by calculation. The size of the overlap region upon region division can be determined by employing a suitable means depending on the built system.

Other Embodiments

The object of the present invention is also achieved by the following method. A recording medium (or storage medium) which records software program codes to implement the functions of the above-described embodiments is supplied to a system or apparatus. The storage medium is a computer-readable storage medium, as a matter of course. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

The computer executes the readout program codes, and the operating system (OS) running on the computer partially or wholly executes actual processing on the basis of the instructions of the program codes, thereby implementing the functions of the above-described embodiments.

Assume that the program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-273088 filed Oct. 19, 2007 and Japanese Patent Application No. 2008-185295 filed Jul. 16, 2008 which are hereby incorporated by reference herein in their entirety.

What is claimed is:

1. An image processing apparatus for rendering a common object which can be viewed from a plurality of viewpoints, comprising:
a management unit which manages a plurality of virtual objects;
a dividing unit which divides a first screen image of a first viewpoint into a first half and a second half regions and divides a second screen image of a second viewpoint into a first half and a second half regions, where the first half and the second half regions of the second screen image correspond those of the first screen image, respectively;
a first determination unit which determines whether a virtual object can be viewed from the first viewpoint in the first half region of the first screen image, one by one in a first order for the first viewpoint among the plurality of virtual objects and determines whether a virtual object can be viewed from the second viewpoint in the second half region of the second screen image, one by one in a first order for the second view point among the plurality of virtual objects;
a first rendering unit which renders the first half region of the first screen image viewed from the first viewpoint based on data of the virtual object which can be viewed from the first viewpoint and renders the second half region of the second screen image viewed from the second viewpoint based on data of the virtual object which can be viewed from the second viewpoint, in parallel;
an update unit which updates the first order for the first viewpoint and the first order for the second viewpoint of the plurality of virtual objects to a second order for the first viewpoint and a second order for the second viewpoint, respectively, by arranging the virtual object which can be viewed from the first viewpoint in the first half region of the first screen image at a high order position in the second order for the second viewpoint and the virtual object which cannot be viewed from the first viewpoint at the lowest order position in the second order for the second viewpoint and arranging the virtual object which can be viewed from the second viewpoint in the second half region of the second screen image at a high order position in the second order for the second viewpoint and the virtual object which cannot be viewed from the first viewpoint at the lowest order position in the second order for the second viewpoint;
a second determination unit which determines whether a virtual object can be viewed from the first viewpoint in the second half region of the first screen image, one by one in the second order for the first viewpoint among the plurality of virtual objects and determines whether a virtual object can be viewed from the second viewpoint in the first half region of the second screen image, one by one in the second order for the second viewpoint among the plurality of virtual objects; and
a second rendering unit which renders the second half region of the first screen image viewed from the first viewpoint based on data of the virtual object which can be viewed from the first viewpoint and renders the first half region of the second screen image viewed from the second viewpoint based on data of the virtual object which can be viewed from the second viewpoint, in parallel.

2. The apparatus according to claim 1, wherein said update unit updates the first order to the second order so that the virtual object which can be viewed from the viewpoint is in the top of the second order.

3. The apparatus according to claim 1, wherein said update unit updates the first order to the second order in a order of search frequency.

4. The apparatus according to claim 1, wherein:
said dividing unit sets a plurality of regions in the first half region of the first screen image of the first viewpoint,
said first determination unit determines whether a virtual object can be viewed from the first viewpoint in each of the set regions in the first half region of the first screen image, one by one in the first order for the first viewpoint among the plurality of virtual objects, said first rendering unit renders the plurality of regions in the first half region of the first screen image viewed from the first viewpoint based on data of the virtual object which can be viewed from the first viewpoint, said update unit updates the first order for the first viewpoint by arranging the virtual object which can be viewed from the first viewpoint in the plurality of regions in the first half region of the first screen image at a high order position in the updated first order of the first viewpoint, and said first determination unit determines whether a virtual object can be viewed from the first viewpoint in a region except the plurality of regions in the first half region of the first screen image, one by one in the updated first order for the first viewpoint among the plurality of virtual objects, said first rendering unit renders the region except the plurality of regions in the first half region of the first screen image viewed from the first viewpoint based on data of the virtual object which can be viewed from the first viewpoint.

5. The apparatus according to claim 1, wherein each of said first rendering unit and said second rendering unit performs rendering by transforming a depth value obtained by the process of rendering into a coordinate system from the viewpoint.

6. The apparatus according to claim 1, wherein the first viewpoint corresponds to one eye of an observer, and the second viewpoint corresponds to the another eye of the observer.

7. The apparatus according to claim 1, wherein the management unit manages a plurality of data items including geometric shape information of the virtual object in a virtual space and material information of the virtual object, and the update unit updates the first order of the plurality of data items including the geometric shape information and the material information of the virtual object to the second order.

8. A non-transitory computer-readable storage medium which stores a program for causing a computer to function as each unit included in an image processing apparatus of claim 1.

9. The apparatus according to claim 1, wherein the rendering information indicates the influence for pixels by a source of light, which influence is obtained by a ray-tracing process.

10. An image processing method executed by an image processing apparatus for rendering a common object which can be viewed from a plurality of viewpoints, comprising:

dividing a first screen image of a first viewpoint into a first half and a second half regions and dividing a second screen image of a second viewpoint into a first half and a second half regions, where the first half and the second half regions of the second screen image correspond to those of the first screen image, respectively;

a first determination step of determining whether a virtual object be viewed from the first viewpoint in the first half region of the first screen image, one by one in a first order for the first viewpoint among the plurality of virtual objects and determining whether a virtual object can be viewed from the second viewpoint in the second half region of the second screen image, one by one in a first order for the second view point among the plurality of virtual objects;

a first rendering step of rendering the first half region of the first screen image viewed from the first viewpoint based on data of the virtual object which can be viewed from the first viewpoint and rendering the second half region of the second screen image viewed from the second viewpoint based on data of the virtual object which can be viewed from the second viewpoint, in parallel;

an updating step of updating the first order for the first viewpoint and the first order for the second viewpoint of the plurality of virtual objects to a second order for the first viewpoint and a second order for the second viewpoint, respectively, by arranging the virtual object which can be viewed from the first viewpoint in the first half region of the first screen image at a high order position in the second order for the second viewpoint and the virtual object which cannot be viewed from the first viewpoint at the lowest order position in the second order for the second viewpoint and arranging the virtual object which can be viewed from the second viewpoint in the second half region of the second screen image at a high order position in the second order for the second viewpoint and the virtual object which cannot be viewed from the first viewpoint at the lowest order position in the second order for the second viewpoint;

a second determination step of determining whether a virtual object can be viewed from the first viewpoint in the second half region of the first screen image, one by one in the second order for the first viewpoint among the plurality of virtual objects and determining whether a virtual object can be viewed from the second viewpoint in the first half region of the second screen image, one by one in the second order for the second viewpoint among the plurality of virtual objects; and a second rendering step of rendering the second half region of the first screen image viewed from the first viewpoint based on data of the virtual object which can be viewed from the first viewpoint and rendering the first half region of the second screen image viewed from the second viewpoint based on data of the virtual object which can be viewed from the second viewpoint, in parallel.

* * * * *